United States Patent [19]
Flach

[11] Patent Number: 5,911,210
[45] Date of Patent: Jun. 15, 1999

[54] METHOD AND APPARATUS FOR SUPPLYING FUEL TO AN INTERNAL COMBUSTION ENGINE

[75] Inventor: Thomas A. Flach, South Vienna, Ohio

[73] Assignee: Cooper Cameron Corporation, Houston, Tex.

[21] Appl. No.: 08/943,955

[22] Filed: Oct. 3, 1997

[51] Int. Cl.[6] .................................................. F02B 43/00
[52] U.S. Cl. .......................................... 123/527; 123/575
[58] Field of Search .................................. 123/1 A, 575, 123/526, 525

[56] References Cited

U.S. PATENT DOCUMENTS

| | | | |
|---|---|---|---|
| 4,033,307 | 7/1977 | John | 123/119 A |
| 4,117,810 | 10/1978 | John | 123/1 |
| 4,495,930 | 1/1985 | Nakajima | 123/575 |
| 4,535,728 | 8/1985 | Batchelor | 123/27 |
| 4,594,201 | 6/1986 | Phillips et al. | 261/18 |
| 4,603,674 | 8/1986 | Tanka | 123/575 |
| 4,989,570 | 2/1991 | Kuribara et al. | 123/494 |
| 5,070,850 | 12/1991 | Davis et al. | 123/527 |
| 5,092,305 | 3/1992 | King | 123/575 |
| 5,469,830 | 11/1995 | Gonzalez | 123/515 |
| 5,560,344 | 10/1996 | Chan | 123/515 |

FOREIGN PATENT DOCUMENTS 2048259  7/1991  Canada.

*Primary Examiner*—Henry C. Yuen
*Assistant Examiner*—Arnold Castro

[57] ABSTRACT

A fuel supply system is provided for an internal combustion engine. The system comprises a fuel control valve metering fuel to the inlet of the engine and a governor for monitoring the output of the engine and adjusting the fuel control valve. A first fuel of low quality is fed to the inlet of the engine through a first valve regulating the supply of the first fuel. A fuel mixture controller responds to output signals from the governor and adjusts the position of a second valve for regulating the supply of a second fuel of high quality. The first and second fuels are combined in a mixture before being fed to the fuel control valve and the inlet of the engine.

45 Claims, 3 Drawing Sheets

METHOD AND APPARATUS FOR SUPPLYING FUEL TO AN INTERNAL COMBUSTION ENGINE

TECHNICAL FIELD OF THE INVENTION

The present invention relates to a method and apparatus for supplying fuel to an internal combustion engine. In particular, the present invention relates to a method and apparatus for supplying a mixture of fuels of differing quality to an internal combustion engine, especially an engine consuming gaseous hydrocarbon fuels.

BACKGROUND OF THE INVENTION

The power output of an internal combustion engine is determined by many factors. One important factor is the energy content of the fuel being consumed by the engine. For a given set of operating conditions, as the energy content of the fuel, typically measured in BTUs, is decreased, so the power generated by the engine decreases. For an engine operating under a given load, this reduction in power output will translate into a reduction in the speed of the engine. In order to return the power output of the engine to the desired level, it is possible to increase the supply of fuel and air to the engine. However, once the fuel/air mixture is being supplied at the maximum rate for the engine, further increases in power output cannot be achieved in this way.

One situation in which this problem arises is in the case of an internal combustion engine burning gaseous hydrocarbons as a fuel, for example at an oil well head. Internal combustion engines are used at well heads, for example, to generate electrical power and drive production equipment. Preferred engines for this operation are those capable of using gaseous hydrocarbons, such as natural gas, as a fuel. It would be highly advantageous if such engines could be powered using gaseous hydrocarbons produced from the well, such as associated gas and gas produced as a result of secondary oil recovery techniques. However, such gases generally have a very low energy content, often containing considerable quantities of carbon dioxide. This is particularly the case with gas produced by secondary oil recovery, which entails injecting carbon dioxide into the well to enhance oil production. The carbon dioxide thus injected is subsequently produced along with the gaseous hydrocarbon fractions, thereby reducing the energy content of the gas and its quality as a fuel.

Operating an internal combustion engine using such low quality fuels as associated gas and gas produced as a result of secondary recovery techniques severely limits the power output available from the engine. As discussed above, once the maximum supply rate of gas to the inlet of the engine has been reached, it is not possible to obtain further increases in power output. This represents a serious restriction in the duties to which the engine can be applied.

Accordingly, there is a need to be able to use low quality fuels, such as associated gas and gas produced as a result of secondary oil recovery, as fuels for internal combustion engines without the heretofore encountered problems of restricting the power output obtainable from the engine.

SUMMARY OF THE INVENTION

In a first aspect, the present invention provides a fuel supply system for an internal combustion engine, which system comprises a fuel control valve for metering fuel to the inlet of the engine, a governor for monitoring the output of the engine and adjusting the fuel control valve, a fuel mixture controller, responsive to the governor, a first valve for regulating the supply of a first fuel of relatively low quality, a second valve for regulating the supply of a second fuel of relatively high quality responsive to the fuel mixture controller, and a mixer for combining the first and second fuel supplied by the first and second valves respectively and supplying the fuel mixture to the fuel control valve.

In a further aspect, the present invention provides an internal combustion engine comprising a fuel inlet, a fuel control valve for metering fuel to the fuel inlet, a governor for monitoring the output of the engine and adjusting the position of the fuel control valve, a fuel mixture controller responsive to the governor, a first valve regulating the supply of a first fuel of low quality, a second valve regulating the supply of a second fuel of high quality responsive to the fuel mixture controller, and a mixer for combining the first and second fuels supplied by the first and second valve respectively and supplying the fuel mixture to the fuel control valve.

References in the present specification to the "quality" of a fuel refer to the energy content of the fuel, typically measured in BTUs per unit volume of fuel. The terms "low" and "high" when used to refer to the quality of the fuel are used in a relative sense in order to provide a comparison of the energy contents of the two fuels. Generally, a low quality fuel will not be capable of generating the maximum power output required of the engine. In extreme cases, the low quality fuel will be incapable of generating the power output required of the engine during normal operation. The power output demanded of the engine at any time during operation is met according to the system of the present invention by blending with the low quality fuel an appropriate quantity of higher quality fuel. The system of the present invention offers the significant advantage that only that amount of high quality fuel required to allow the engine to achieve the desired duty is consumed. In this way, the consumption of the low quality fuel is maximized, while keeping the consumption of the more expensive, higher quality fuel to a minimum.

The fuel supply system of the present invention may be used for supplying both liquid and/or gaseous fuels to an internal combustion engine.

The fuel supply system of the present invention is particularly advantageous when applied to internal combustion engines consuming gaseous hydrocarbon fuel as the first fuel. A suitable first fuel in this respect is associated gas produced as a result of oil production operations. Particular advantage arises, when the fuel supply system is used to supply associated gas produced as a result of secondary oil recovery techniques. Associated gas produced by such techniques typically contains a significant quantity of carbon dioxide and, for this reason, has a lower energy content and is suitable for use as the first fuel. in such cases, it is preferred that the second fuel is also a gaseous hydrocarbon. A most suitable gaseous hydrocarbon of high quality is natural gas.

The fuel is metered to the inlet of the engine by means of a fuel control valve. Such control valves are well known in the art and available commercially. The flow of fuel to the inlet of the engine is controlled by adjusting the fuel control valve, carried out by the governor. The governor monitors the power output of the engine, e.g. by monitoring the speed of rotation of the engine, and adjusts the fuel control valve to maintain a preset output of the engine. Arrangements for connecting the governor with the fuel control valve so as to allow the control valve to be adjusted are well known in the art and include mechanical linkages between the governor and the fuel control valve and electrical connections, whereby the fuel control valve responds to electrical control signals generated by the governor. The fuel control valve may be activated by a pressure signal generated by a current-to-pressure converter, which receives and responds to electrical signals generated by the governor.

The fuel supply system of the present invention further comprises a fuel mixture controller responsive to the output of the governor. Suitable controllers for use as the fuel mixture controller are known and available commercially. In the fuel supply systems in which the governor is connected to the fuel control valve by a mechanical linkage, the fuel mixture controller advantageously responds to the position of the mechanical linkage. Preferred, however, is to use an electrical connection between the governor and the fuel control valve, in which case the fuel mixture controller responds to the electrical control signal generated by the governor.

In order to allow the engine to be started easily and avoid the risk of the engine flooding during the start-up procedure, the fuel supply system preferably comprises a by-pass, whereby the second fuel alone may be fed to the inlet of the engine. Typically, supply pressures for the fuels under normal operating conditions of the engine will be higher than those required to start the engine. Accordingly, the by-pass preferably comprises a pressure reducer for reducing the supply pressure of the second fuel during the start-up procedure.

In operation, the fuel supply system of the present invention continually adjusts the relative amounts of the first and second fuels in the fuel mixture being supplied to the inlet of the internal combustion engine. In this way, the energy content of the fuel mixture is adjusted and matched to the required power output of the engine. Fluctuations in the quality of the first fuel are, thereby, compensated for, without resulting in a reduced power output from the engine. Changes in the composition of the fuel mixture as result of the operation of the fuel supply system may, in turn, lead to changes in the combustion characteristics of the fuel mixture once in the cylinders of the engine. Accordingly, the fuel supply system advantageously further comprises an ignition timing regulator, responsive to the fuel mixture controller, such that the ignition timing of the engine may be adjusted in line with adjustments in the fuel mixture.

In a further aspect, the present invention provides a method for operating an internal combustion engine, which method comprises supplying a first fuel of low quality to the inlet of the engine, monitoring the output of the engine and comparing the output with a desired engine output, maintaining the desired engine output by adjusting the supply rate of the first fuel to the engine, providing a supply of a second fuel of high quality, and if the desired output is not achieved by the supply of the first fuel alone, supplying the second fuel to the inlet of the engine in an amount to achieve the desired output of the engine.

A further aspect of the present invention provides a method for operating an internal combustion engine, which method comprises supplying a first fuel of low quality to the inlet of the engine, and supplying a second fuel of high quality to the engine in an amount to achieve a desired output of the engine.

BRIEF DESCRIPTION OF THE DRAWINGS

The present invention will be understood more fully from the detailed description given herein below and from the accompanying drawings of preferred embodiments of the invention. The description and drawings should not be taken to limit the invention to the specific embodiments, but are for explanation and understanding purposes only.

In the drawings.

DESCRIPTION OF THE PREFERRED EMBODIMENTS OF THE INVENTION

Figure 1:
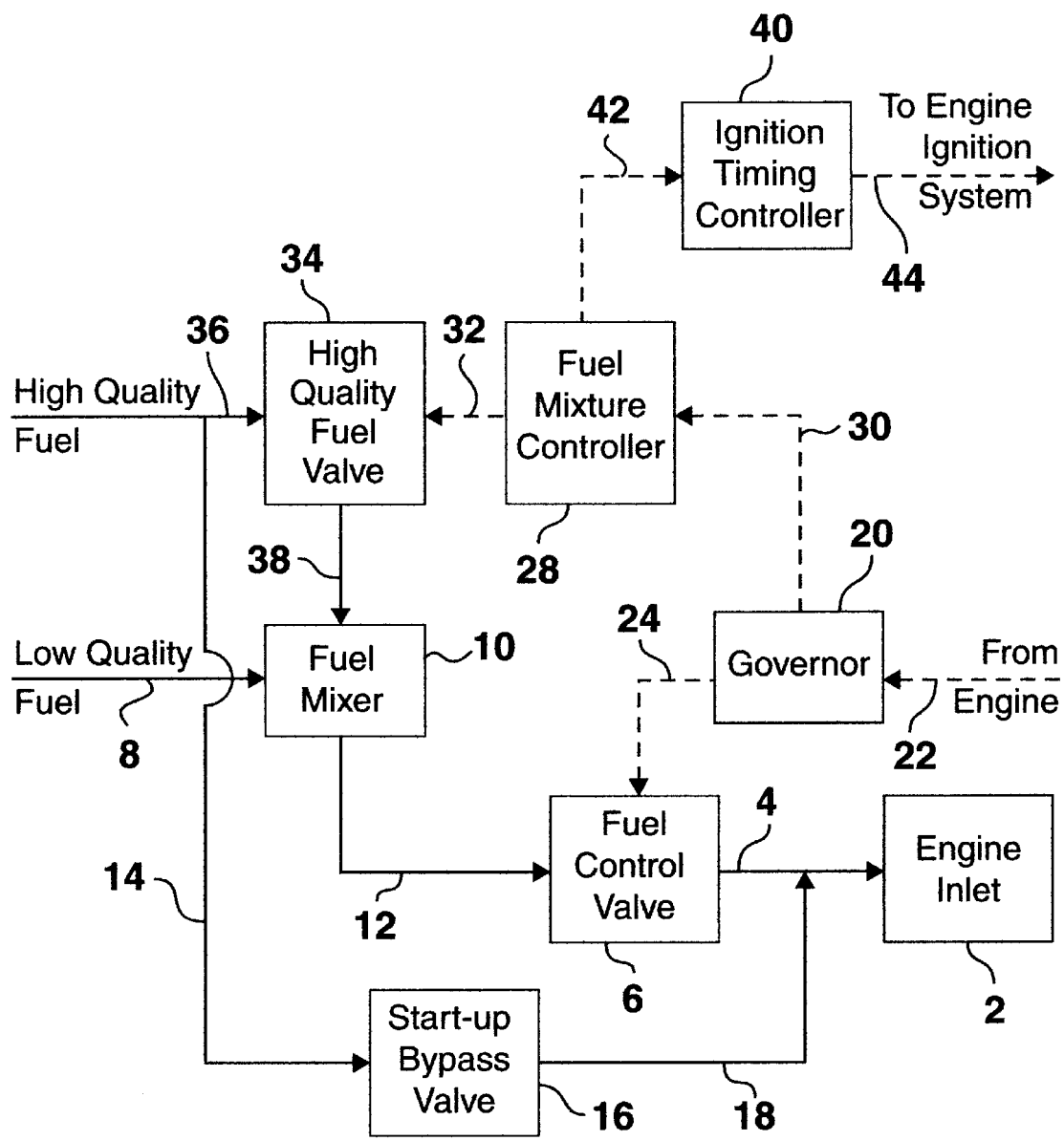
FIG. 1 is a schematic representation of a fuel supply system according to the general principles of the present invention.

Referring to FIG. 1, there is shown a general representation of a fuel system according to the present invention. An internal combustion engine has an inlet 2. Fuel is supplied to the inlet 2 through a fuel line 4. The rate of supply of fuel to the inlet 2 is controlled by a fuel control valve 6. A low quality fuel is supplied through a fuel line 8 via a fuel mixer 10 and a fuel line 12 to the fuel control valve 6.

For ease of starting the engine and for avoiding flooding the engine during the start-up procedure, a by-pass system is provided. The by-pass system comprises a fuel line 14 through which high quality fuel may be supplied to a bypass valve 16, with fuel being supplied by the by-pass valve 16 to the engine inlet 2 through a by-pass fuel line 18. During the start-up procedure, the fuel control valve 6 is closed and the engine is started using high quality fuel, with the flow rate of fuel to the engine inlet 2 being regulated by means of the by-pass valve 16.

The fuel supply system further comprises a governor 20. The governor 20 monitors the power output of the engine. Information regarding the power developed by the engine is indicated in FIG. 1 as being received by the governor 20 via means generally indicated by signal line 22. Means by which the power output of the internal combustion engine may be monitored and the information transmitted to the governor 20 are well known in the art. Suitable means include a magnetic pick which senses engine speed or an optical rotation sensor working in conjunction with a rotating shaft of the engine. The governor 20 adjusts the position of the fuel valve 6 in response to the input received via the signal line 22 regarding the power being output by the engine. The connection between the governor 20 and the fuel control valve 6 is generally indicated by the signal line 24 in FIG. 1. The connection represented by the signal line 24 may be a mechanical linkage between the governor 20 and the fuel control valve 6. Alternatively. the governor may generate a control signal, e.g. an electrical signal or a pressure signal, which is translated into an adjustment of the fuel control valve 6. In one preferred embodiment, the governor 20 generates an electrical signal which is fed to a I/P (current-to-pressure) converter, which in turn generates a pressure signal for adjusting the position of the fuel control valve 6.

A fuel mixture controller 28 is provided, acting in response to an output signal generated by the governor 20. The output signal of the governor 20 is generally indicated by a signal line 30 in FIG. 1. The governor 20 may generate a specific output signal for the fuel mixture controller 28. Alternatively, the signal received by the fuel mixture controller 28 via the signal line 30 may be generated by detecting the signal generated by the governor 20 and transmitted to the fuel control valve 6, e.g. by means of a position sensor monitoring the movement in the mechanical linkage between the governor 20 and the fuel valve 6, or by means of a voltage or current detector measuring an electrical signal generated by the governor 20 for adjusting the position of the fuel control valve 6. The output signal generated by the fuel mixture controller 28 is transmitted via a signal line 32 to a fuel valve 34. High quality fuel is supplied via a fuel line 36 to the high quality fuel valve 34 and, thereafter, via a fuel line 38 to the fuel mixer 10. The fuel mixture controller 28 may have a mechanical linkage with the high quality fuel valve 34 in order to adjust the position of the valve in response to the signal received via the signal line 30. Alternatively, the fuel mixture controller 28 may generate a signal, e.g. a pressure or electrical signal, which is interpreted and used to adjust the position of the high quality fuel valve 34. In one embodiment, the fuel mixture controller 28 generates an electrical signal which is interpreted by a I/P (current-to-pressure) converter, which in turn generates a pressure signal for adjusting the position of the high quality fuel valve 34.

The fuel system illustrated in FIG. 1 further comprises an ignition timing controller 40, responding to an output from the fuel mixture controller 28 via a signal line 42. The ignition timing controller 40 is connected to and is able to adjust the timing setting of the ignition system of the engine, the connection through which is generally indicated in FIG. 1 by the signal line 44.

In operation, the governor 20 adjusts the position of the fuel control valve 6 by means of the connection 24 in response to signals received via the signal line 22 regarding the power being output by the engine. For maximum fuel economy, that is maximum consumption of the low quality fuel and minimum consumption of the high quality fuel, the governor 20 is set such that the fuel control valve 6 is at a position of at least 75% of the fully open position, preferably at least 80% of the fully open position, more preferably at least 90% of the fully open position. When the fuel mixture controller 28 receives a signal via the signal line 30 that the governor 20 is attempting to open the fuel control valve 6 still further, it generates a signal transmitted via the signal line 32 to open the high quality fuel valve 34, thereby increasing the flow rate of high quality fuel through the fuel line 38 to the fuel mixer 10 and ultimately to the engine inlet 2. During normal operation, the governor 20 may be caused to open the fuel control valve 6 as a result of an increased demand in the power being output by the engines. Alternatively, the governor 20 can be caused to open the fuel control valve 6 by fluctuations in the compositions and, hence, the energy content of the low quality fuel, in turn resulting in a drop in the power being output by the engine.

Conversely, should the governor 20 act to close the fuel control valve 6, the fuel mixture controller 28 will respond by closing the high quality fuel valve 34, thereby reducing the flow of high quality fuel to the engine inlet 2. The governor 20 can be forced to close the fuel control valve 6 in cases when the power demand on the engine decreases or when the composition of the low quality fuel changes to one with a higher energy content.

Figure 2:
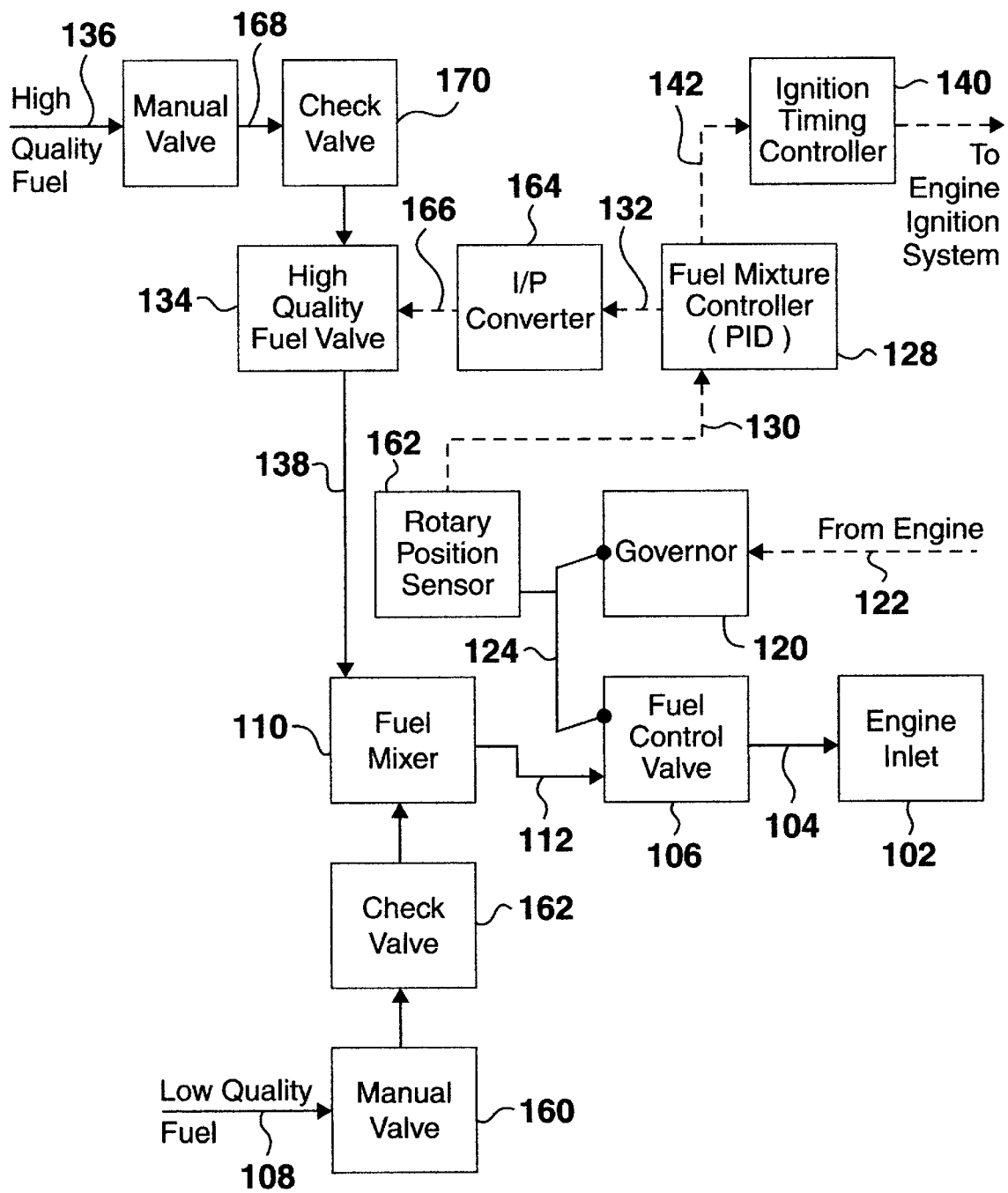
FIG. 2 is a schematic representation of a first preferred embodiment of the fuel system of the present invention.

Referring to FIG. 2, there is shown a detailed schematic representation of a fuel system according to one embodiment of the present invention. The system of FIG. 2 has the same general configuration and components as the system generally illustrated in FIG. 1. The features of the fuel supply system illustrated in FIG. 2 corresponding with the features comprising the general system illustrated in FIG. 1 are identified by three-digit reference numerals, of which the last two reference numerals are the same as those in FIG. 1. Thus, an engine inlet 102 is supplied with fuel via a fuel line 104 from a fuel control valve 106. Low quality fuel is supplied via a fuel line 108. A fuel mixer 110 receives low quality fuel via a manual valve 160 and a check valve 162. The fuel control valve 106 receives fuel from the fuel mixer 110 via fuel line 112. The fuel control system illustrated in FIG. 2 comprises a start-up by-pass system having the features illustrated in FIG. 1 and described above (omitted from FIG. 2 for clarity). A governor 120 receives information regarding the power being output by the engine by means generally indicated as 122. The governor 120 is connected to the fuel control valve 106 by means of a mechanical linkage 124, whereby the governor adjusts the position of the fuel control valve 106 and, hence, the flow rate of fuel therethrough. A fuel mixture controller 128 is provided. A most suitable controller for use as the fuel mixture controller 128 in FIG. 2 is a self-tuning controller having a PID (proportional+integral+differential) action. Such controllers are commercially available (e.g. ex. Omega). The fuel mixture controller 128 receives a signal via a signal line 130 from a rotary position sensor 162, monitoring the position of the mechanical linkage 124 between the governor 120 and the fuel control valve 106. Suitable rotary position sensors and the associated hardware are available commercially and well known in the art. In response to a signal received via the signal line 130, the fuel mixture controller 128 generates an output signal supplied via a signal line 132 to an I/P (current-to-pressure) converter 164. The converter 164 in response to the electrical signal received via the signal line 132 generates a pressure signal in a signal line 166. A high quality fuel valve 134 responds to the pressure signal received via the signal line 166, in turn adjusting the flow of high quality fuel received through a fuel line 136. The high quality fuel is fed from the high quality fuel valve 134 through a fuel line 138 to the fuel mixer 110. A manual valve 168 and a check valve 160 are provided in the high quality fuel line upstream of the high quality fuel valve 134. When the fuel supply system of FIG. 2 is applied to an internal combustion engine consuming a gaseous fuel as the high quality fuel, the high quality fuel valve 134 may be a volume booster (commercially available, e.g. ex. Fairchild) responding to the pressure signal from the I/P converter 164 to adjust the pressure of the high quality gas and, hence, the flow rate.

As in the general system illustrated in FIG. 1, the fuel supply system according to this embodiment comprises an ignition timing controller 140, which acts in response to signals received from the fuel mixture controller 128 via a signal line 142 to adjust the timing of the ignition system of the internal combustion engine.

In operation, the governor 120 responds to changes in the power being output by the engine by adjusting the position of the fuel control valve 106 by means of the mechanical linkage 124. Under normal operating conditions, the governor 120 holds the fuel valve 106 in a substantially fully open position, as described hereinabove in connection with the operation of the general system of FIG. 1. Attempts by the governor 120 to open the fuel control valve result in movement of the mechanical linkage 124. This movement is sensed by the rotary position sensor 162, which in turn generates a signal input to the fuel mixture controller 128 via the signal line 130. In response, the fuel mixture controller 128 sends a signal to the I/P convertor which opens the high quality fuel valve 134, increasing the flow of high quality fuel to the fuel mixer 110 and ultimately the engine inlet 102. Conversely, attempts by the governor to close the fuel control valve 106 result in closure of the high quality fuel valve by a similar procedure.

Figure 3:
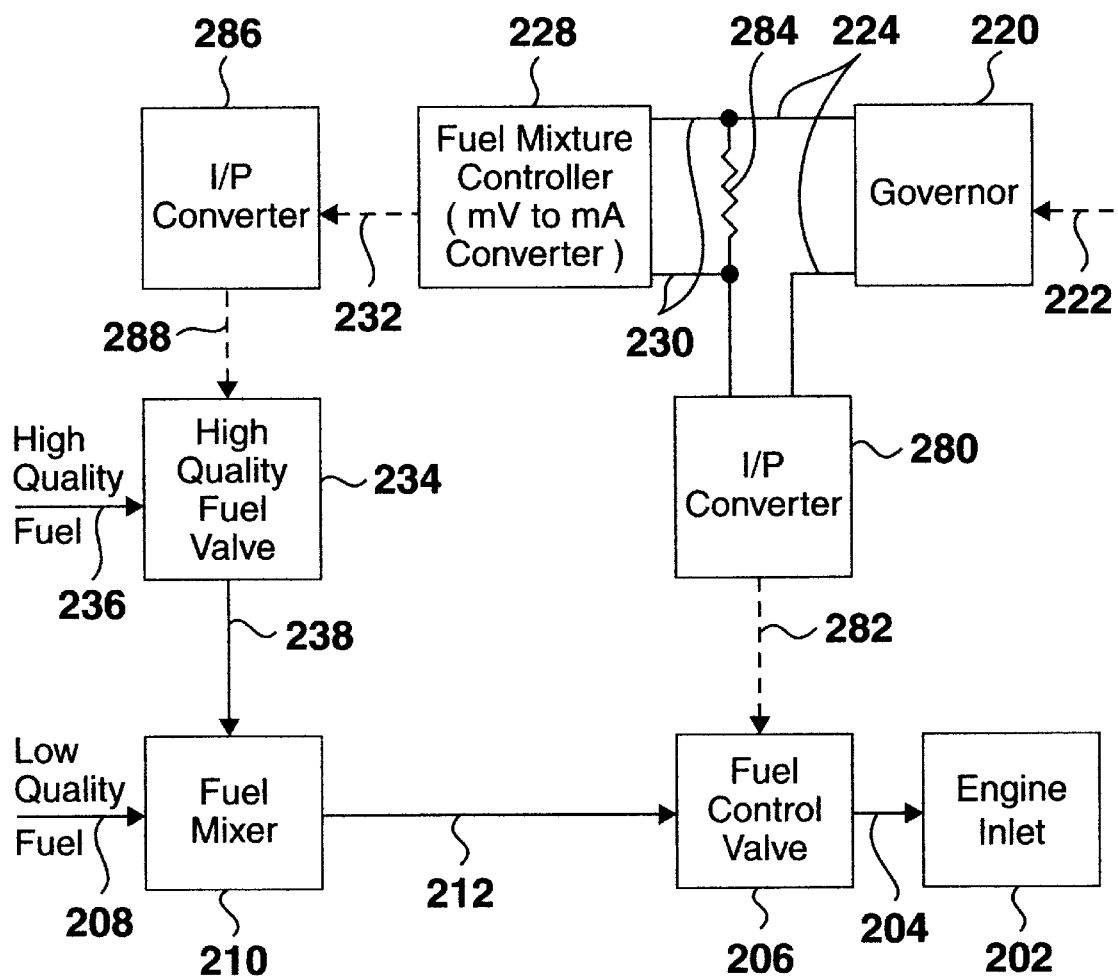
FIG. 3 is a schematic representation of a second preferred embodiment of the fuel system of the present invention.

Referring to FIG. 3, there is shown a simplified diagram of a further embodiment of the fuel control system of the present invention. The ignition timing controller, the by-pass circuit, and the various manual valves and check valves shown in FIGS. 1 and 2 have been omitted from FIG. 3 for clarity purposes. However, it will be understood that these features are preferred and the fuel control system shown in FIG. 3 comprises these features in addition to those shown. The reference numerals identifying the features in FIG. 3 are three-digit numbers. Features in FIG. 3 corresponding to features of the general system illustrated in FIG. 1 have the reference numerals of FIG. 1 as their last two digits.

In FIG. 3, an internal combustion engine has an inlet 202 supplied with fuel via a fuel line 204 through a fuel control valve 206. Low quality fuel is supplied via a fuel line 208 to a fuel mixer 210 from which fuel is fed to the fuel control valve 206 via a fuel line 212. A governor 220 monitors the power output of the internal combustion engine and receives an input by means generally indicated by signal line 222. The governor 220 generates an electrical signal as an output, transmitted via electrical signal lines 224 to an I/P (current-to-pressure) converter 280. In response to the electrical signal received, the I/P converter 280 generates a pressure signal transmitted via a signal line 282 to the fuel control valve 206. The signal lines 224 form a circuit with the governor 220 and the I/P convertor 280, which circuit comprises a resistor 284 in one of the signal lines. A fuel mixture controller 228 senses the voltage drop across the resistor 284 by means of signal lines 230. In response to the voltage signal received, the fuel mixture controller 228 generates a current signal which it transmits via a signal line 232 to a I/P (current-to-pressure) converter 286. In response to a current signal received, the I/P converter 286 generates a pressure signal transmitted via a signal line 288 to a high quality fuel valve 234. High quality fuel is supplied to the high quality fuel valve 234 through a fuel line 236 and its flow regulated by the fuel valve 234 before being fed to the fuel mixer 210 through a fuel line 238.

In operation, the position of the fuel control valve 206 is adjusted by the I/P converter 280 in response to the electrical signal received via the signal line 224 from the governor 220. As described above, under normal operating conditions the fuel control valve 206 is maintained in a position to give at least 70% of maximum fuel flow, more preferably at least 80%, more preferably 90% of the maximum fuel throughput. A change in the electrical signal in the signal line 224 from the governor 220 causing the I/P converter 280 to further open the fuel control valve 206 generates a change in the voltage drop across resistor 284. The fuel mixture controller 228 responds to this change in the voltage drop by generating a signal in the signal line 232 to the I/P converter 286, in turn opening the high quality fuel valve 234, thus increasing the flow of high quality fuel to the fuel mixer 210. Conversely, a signal in the signal line 224 from the governor 220 to the I/P converter 280 to close the fuel control valve 206 generates an opposite change in the voltage drop across resistor 284. In response to this change, the fuel mixture controller 288 signals the I/P converter 286 to close the high quality fuel valve 234 and reduce the flow of the high quality fuel to the fuel mixer 210.

To further illustrate the fuel supply system of the present invention, the system shown in FIG. 2 was assembled on an Ajax model DPC-180 LE internal combustion engine consuming gaseous hydrocarbon fuel. The low quality fuel supplied to the engine was a hydrocarbon gas produced as a result of secondary oil recovery techniques using carbon dioxide injection. The composition of the hydrocarbon gas used as the low quality fuel is set out in Table 1 below:

TABLE 1

|  | Mole % | BTU/cu. ft. |
| --- | --- | --- |
| Nitrogen | 2.980 | 0.000 |
| Methane | 15.479 | 143.615 |
| CO2 | 69.636 | 0.000 |
| Ethane | 4.817 | 78.304 |
| hydrogen sulfide | 0.044 | 0.258 |
| Propane | 4.920 | 113.718 |
| i-Butane | 0.619 | 18.491 |
| n-Butane | 1.505 | 45.102 |
| Total | 100.000 | 399.488 |

As the high quality fuel provided to the fuel supply system of FIG. 2, a gaseous hydrocarbon fuel having the composition set out in Table 2 below was used.

TABLE 2

|  | Mole % | BTU/cu. ft. |
| --- | --- | --- |
| Nitrogen | 18.494 | 0.000 |
| Methane | 71.465 | 633.055 |
| CO2 | 0.208 | 0.000 |
| Ethane | 6.586 | 107.061 |
| hydrogen sulfide | 0.000 | 0.000 |
| Propane | 2.710 | 62.637 |
| i-Butane | 0.210 | 6.273 |
| n-Butane | 0.327 | 9.800 |
| Total | 100.000 | 848.826 |

The internal combustion engine was operated and the load applied to the engine adjusted to three different levels, in order to test the efficiency of the fuel supply system of the present invention. The composition of the fuel mixture entering the fuel inlet of the engine was measured in order to determine the ability of the fuel supply system to mix the two fuels. The results of the three runs are set out in Table 3 below:

TABLE 3

|  | Load I | | Load II | | Load III | |
| --- | --- | --- | --- | --- | --- | --- |
|  | Mole % | BTU | Mole % | BTU | Mole % | BTU |
| Nitrogen | 9.922 | 0.000 | 8.395 | 0.000 | 7.914 | 0.000 |
| Methane | 43.354 | 402.240 | 34.215 | 317.448 | 32.600 | 302.464 |
| CO2 | 36.291 | 0.000 | 46.417 | 0.000 | 48.453 | 0.000 |
| Ethane | 5.247 | 85.294 | 5.161 | 83.896 | 5.088 | 82.710 |
| hydrogen sulfide | 0.022 | 0.129 | 0.014 | 0.082 | 0.034 | 0.199 |
| Propane | 3.770 | 87.137 | 4.169 | 96.359 | 4.237 | 97.931 |
| i-Butane | 0.424 | 12.666 | 0.489 | 14.608 | 0.500 | 14.936 |
| n-Butane | 0.970 | 29.069 | 1.140 | 34.164 | 1.174 | 35.182 |
| Total | 100.000 | 616.536 | 100.000 | 546.557 | 100.000 | 533.423 |

As can be seen from Table 3, the fuel supply system proved able to blend the low quality fuel gas and the high quality fuel gas to meet the power demands placed on the internal combustion engine. Analysis of the composition of the gas mixture entering the inlet of the engine under the three load conditions indicates that under load I, the fuel mixture supplied by the fuel supply system comprised 49.8% high quality fuel gas, under load II 33.5% high quality fuel gas, and under load III 30.6% high quality fuel gas.

What is claimed is:

1. A fuel supply system for an internal combustion engine, which system comprises:

a fuel control valve for metering fuel to the inlet of the engine;

a governor for monitoring the power output of the engine and adjusting the fuel control valve;

a fuel mixture controller responsive to the governor;

a first valve for regulating the supply of a first fuel of low quality;

a second valve for regulating the supply of a second fuel of high quality responsive to the fuel mixture controller; and a mixer for combining the first and second fuels supplied by the first and second valves respectively and supplying the fuel mixture to the fuel control valve;

the controller being set so as to open the second valve only when the desired power output of the engine is not achieved.

2. A fuel supply system according to claim 1, wherein the first fuel is a gaseous hydrocarbon.

3. A fuel supply system according to claim 2, wherein first fuel is associated gas.

4. A fuel supply system according to claim 3, wherein the first fuel is produced by secondary oil recovery.

5. A fuel supply system according to claim 2, wherein the second fuel is a gaseous hydrocarbon.

6. A fuel supply system according to claim 5, wherein second fuel is a natural gas.

7. A fuel supply system according to claim 1, wherein the governor is connected to and adjusts the fuel control valve by a mechanical linkage, the fuel mixture controller responding to the position of the mechanical linkage.

8. A fuel supply system according to claim 1, wherein the fuel control valve is adjustable in response to an electrical control signal generated by the governor, the fuel mixture controller being responsive to the electrical control signal.

9. A fuel supply system according to claim 1, wherein the system further comprises a bypass, whereby the second fuel alone may be fed to the inlet of the engine.

10. A fuel supply system according to claim 9, wherein the bypass comprises a pressure reducer for the second fuel.

11. A fuel supply system according to claim 1, further comprising an ignition timing regulator responsive to the fuel mixture controller.

12. A method for operating an internal combustion engine, which method comprises:

supplying a first fuel of low quality to the inlet of the engine;

monitoring the power output of the engine and comparing the output with a desired engine output;

maintaining the desired engine output by adjusting the supply rate of the first fuel to the engine;

providing a supply of a second fuel of high quality; and if the desired output is not achieved by the supply of the first fuel alone, supplying the second fuel to the inlet of the engine in an amount to achieve the desired power output of the engine.

13. A method according to claim 12, wherein the first fuel is a gaseous hydrocarbon.

14. A method according to claim 13, wherein the first fuel is associated gas.

15. A method according to claim 14, wherein the first fuel is produced by secondary oil recovery.

16. A method according to claim 12, wherein the second fuel is a gaseous hydrocarbon.

17. A method according to claim 16, wherein the second fuel is natural gas.

18. A method according to claim 12, wherein the power output of the engine is monitored by a governor, which governor controls the flow of fuel to the inlet of the engine by adjusting the position of a fuel control valve through a mechanical linkage extending between the governor and the fuel control valve, the power output of the engine being established by monitoring the position of the said mechanical linkage.

19. A method according to claim 12, wherein the output of the engine is monitored by a governor generating an electrical control signal transmitted to a fuel control valve for metering fuel to the inlet of the engine, the output of the engine being established by monitoring the said electrical control signal.

20. A method according to claim 12, wherein the speed of the engine is used for monitoring the power output of the engine.

21. A method according to claim 12, wherein the power output of the engine is monitored without directly interfering with the speed control of the engine.

22. A method according to claim 12, wherein the ignition timing of the engine is adjusted in accordance with any adjustment in the supply of the second fuel to the inlet of the engine.

23. An internal combustion engine comprising a fuel inlet;

a fuel control valve for metering fuel to the fuel inlet;

a governor for monitoring the power output of the engine and adjusting the position of the fuel control valve;

a fuel mixture controller responsive to the governor;

a first valve for regulating the supply of a first fuel of low quality;

a second valve for regulating the supply of a second fuel of high quality responsive to the fuel mixture controller;

a mixer for combining the first and second fuels supplied by the first and second valves respectively and supplying the fuel mixture to the fuel control valve;

the controller being set so as to open the second valve only when the desired power output of the engine is not achieved.

24. An internal combustion engine according to claim 23, wherein the first fuel is a gaseous hydrocarbon.

25. An internal combustion engine according to claim 24, wherein the first fuel is associated gas.

26. An internal combustion engine according to claim 25, wherein the first fuel is produced by secondary oil recovery.

27. An internal combustion engine according to claim 23, wherein the second fuel is a gaseous hydrocarbon.

28. An internal combustion engine according to claim 27, wherein the second fuel is a natural gas.

29. An internal combustion engine according to claim 23, wherein the governor is connected to and adjusts the fuel control valve by a mechanical linkage, the fuel mixture controller responding to the position of the mechanical linkage.

30. An internal combustion engine according to claim 23, wherein the fuel control valve is adjustable in response to an electrical control signal generated by the governor, the fuel mixture controller being responsive to the electrical control signal.

31. An internal combustion engine according to claim 23, wherein the system further comprises a bypass, whereby the second fuel alone may be fed to the inlet of the engine.

32. An internal combustion engine according to claim 31, wherein the bypass comprises a pressure reducer for the second fuel.

33. A fuel supply system according to claim 23, further comprising an ignition timing regulator responsive to the fuel mixture controller.

34. A method for operating an internal combustion engine, which method comprises supplying a first fuel of low quality to the inlet of the engine; and supplying a second fuel of high quality to the inlet of the engine in an amount to achieve a desired power output of the engine.

35. A method according to claim 34, wherein the first fuel is a gaseous hydrocarbon.

36. A method according to claim 35, wherein the first fuel is associated gas.

37. A method according to claim 35, wherein the first fuel is produced by secondary oil recovery.

38. A method according to claim 34, wherein the second fuel is a gaseous hydrocarbon.

39. A method according to claim 38, wherein the second fuel is natural gas.

40. A method according to claim 34, wherein the output of the engine is monitored by a governor, which governor controls the flow of fuel to the inlet of the engine by adjusting the position of a fuel control valve through a mechanical linkage extending between the governor and the fuel control valve, the power output of the engine being established by monitoring the position of the said mechanical linkage.

41. A method according to claim 34, wherein the power output of the engine is monitored by a governor generating an electrical control signal transmitted to a fuel control valve for metering fuel to the inlet of the engine, the power output of the engine being established by monitoring the said electrical control signal.

42. A method according to claim 34, wherein the speed of the engine is used for monitoring the power output of the engine.

43. A method according to claim 34, wherein the power output of the engine is monitored without directly interfering with the speed control of the engine.

44. A method according to claim 34, wherein the ignition timing of the engine is adjusted in accordance with adjustment in the supply of the second fuel to the inlet of the engine.

45. An internal combustion engine for operating with a hydrocarbon gas as a fuel, comprising a fuel inlet and a fuel supply system for supplying fuel to the fuel inlet, the fuel supply system comprising:

a fuel control valve for metering fuel to the inlet of the engine;

a governor for monitoring the power output of the engine and adjusting the fuel control valve;

a fuel mixture controller responsive to the governor;

a first valve for regulating the supply of associated gas to the engine;

a second valve for regulating the supply of fuel gas responsive to the fuel mixture controller;

a mixer for combining the associated gas and the fuel gas supplied by the first and second valves respectively and supplying the fuel mixture to the fuel control valve; and an ignition timing controller responsive to the fuel mixture controller and connected to the ignition system of the engine;

the controller being set so as to open the second valve only when the desired power output of the engine is not achieved.

* * * * *